ical mill capacity which has never been available in this form, it has been largely given up.

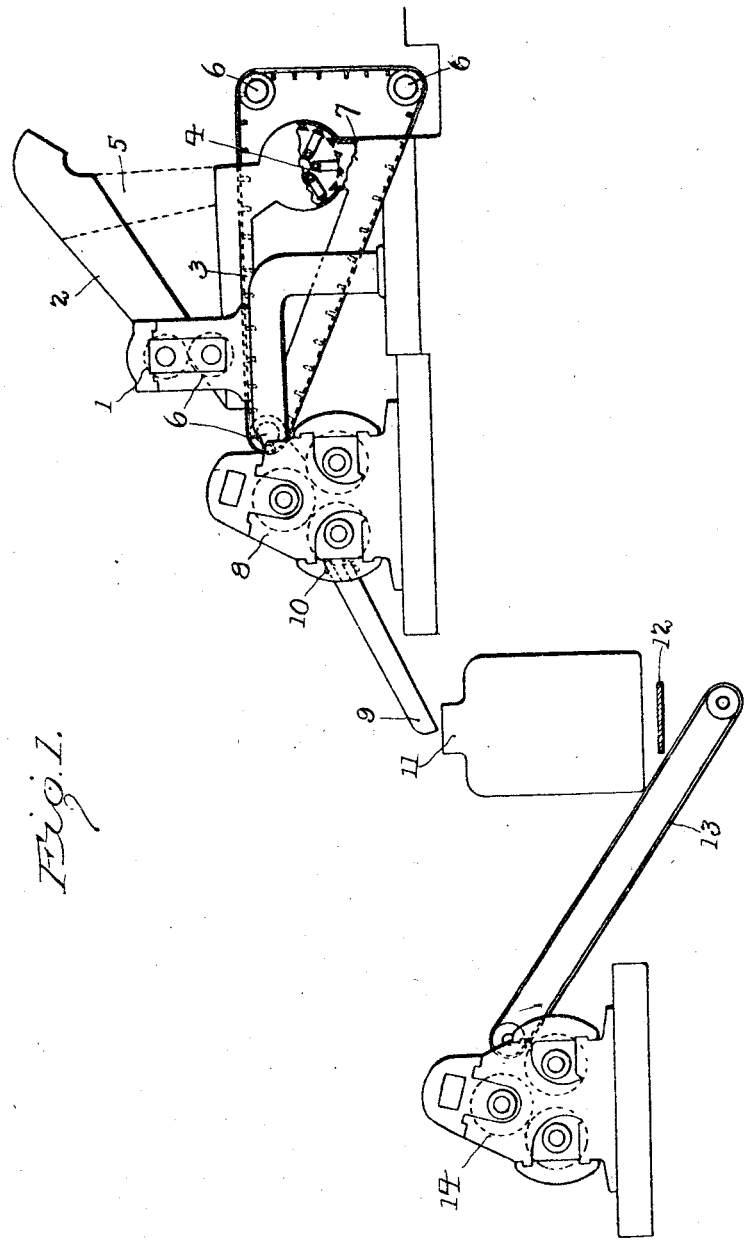

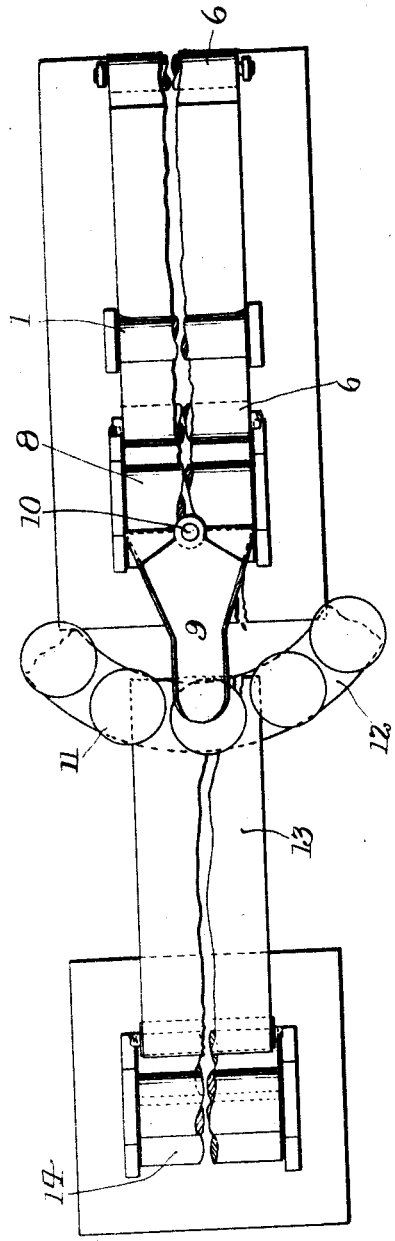

UNITED STATES PATENT OFFICE.

WILLIAM SEARBY, OF PUUNENE, TERRITORY OF HAWAII.

EXTRACTING SUGAR.

1,185,009.  Specification of Letters Patent.  Patented May 30, 1916.

Application filed October 16, 1915. Serial No. 56,182.

*To all whom it may concern:*

Be it known that I, WILLIAM SEARBY, a citizen of the United States, residing at Puunene, in the county of Maui and Territory of Hawaii, have invented certain new and useful Improvements in Extracting Sugar, of which the following is a specification.

This invention relates to extracting sugar; and it comprises a method of recovering sugar juices from cane, sorghum and the like, with substantial completeness while avoiding high dilution of such juices and at the same time recovering the bagasse or fibrous matter of the cane in a freely combustible form and with high fuel value, wherein such cane is subjected to a beating or shredding operation to laterally loosen and separate the fibers while leaving such fibers comparatively long and is subjected to a rolling pressure to extract a large measure of the natural juice, such rolling operation being either before or after such shredding but advantageously both before and after, and wherein such cane is thereafter treated by a systematic soaking or diffusion action to recover further juice, and is finally again submitted to rolling pressure; all as more fully hereinafter set forth and as claimed.

In the best modern practice in sugar houses working on cane, the cane is crushed or rolled between powerful rollers for the purpose of expressing the juice; there being sometimes as many as nine or ten 3-roll mills arranged in series for the treatment of the cane. Ordinarily, in the practice known as maceration, water or dilute cane juice is sprinkled on the expanding cane as it passes from one mill prior to its passing to the next, this being done to aid in recovering the rich juice still left in the cane after the pressing. This addition of water aids in recovering more sugar; but of course necessitates more evaporation, and the limit to it is reached where the additional sugar recovered is not equal to the additional cost of evaporation. Relatively large amounts of water must be used since in the flattened or crushed cane circumstances are not favorable to quick and complete equalization or mixing of the added water and the juice present. In any milling operation many of the juice-containing cells are not crushed and reliance must be on equalization by diffusion through the cell wall. But since the fiber bundles are not well separated, some fibers are always inclosed, and diffusion is slow. The water and sugar must diffuse through a plurality of cells. And this fact, as much as anything, is the necessity for the long and expensive train of heavy mills which are used. The steam consumption for power in driving these mills is of course relatively large.

In mill practice the final bagasse from the last mill is expected to furnish the fuel necessary for the operation of the sugar house. After passing through the last mill it is left with around 45 per cent. water in it and is combustible enough to be used under the boilers of the sugar houses. Any deficit however in the amount of bagasse, any additional moisture in it or any increased use of steam in the sugar house may necessitate the purchase of outside fuel which is always relatively expensive where sugar houses are located. In burning the bagasse under the boilers, obviously every per cent. of water still left in it must be evaporated off and this not only reduces the fuel value but reduces the amount of water which can be evaporated by the steam in the vacuum pans and in the sugar house evaporators.

A more efficient method of recovering sugar from sugar cane is what is known as diffusion; a process in which the finely comminuted cane, which is generally chipped into transverse slices, is soaked with water in a methodical manner, time being allowed for the penetration of the water through the chips and the diffusion of the sugar outward. Rarely the cane chips are moved against a current of water; sometimes the chips in suitable baskets are taken from one container to another to attain the same object of countercurrent treatment; but generally the chips are placed in one of a series of stationary tanks or diffusion cells and a small amount of water run through these cells methodically in such a manner that the fresh chips are treated with water which has gone through 10 or 11 cells while the nearly exhausted chips are treated with fresh water. Diffusion was quite generally practised at one time but great difficulty was experienced in keeping the chipping or slicing machines in good working order and their capacity was altogether too limited for modern factory needs and since it gave a rather high dilution, necessitating additional evaporation, and since in practice the final chips could not be dried by roller mills sufficiently to be used for fuel, diffusion has now gone into disuse so far as cane and sorghum are concerned. The chips suitable for diffusion will not enter the "pinch" of the ordinary roller mill where the mill is set tight enough to express any substantial amount of water. I have however found that by a special mode of operation I can combine the advantages of the diffusion process and the milling process, securing an exceptionally high extraction with a smaller consumption of power, a low dilution and a final bagasse which will have greater steam-raising power than that now produced in roller mills in that it is somewhat drier, running 40 per cent. or less of water where ordinary mill bagasse runs 45 or thereabout. This decrease in the amount of water represents a greater steam raising efficiency.

As I have found, by subjecting the cane to a beating or shredding operation in such a manner as to convert the tissues into a loose fibrous mass of what may be called an "excelsior-like" character, and then rolling, I can secure a much better extraction. In another application, now Patent No. 1,146,456 of July 13, 1915, I have described and claimed a mode of utilizing this discovery wherein cane is beaten in this manner and is then subjected to a plurality of rolling operations, maceration being used if desired. In the most advantageous embodiment of that invention, cane is rolled to convert it into flattened or ribbon-like strips and secure a portion of juice, is thereafter beaten to shred it to a loose fibrous mass and is then rolled a plurality of times to extract the remaining juice.

In the present invention I utilize the same discovery in a somewhat different manner. I shred or beat the cane into the described loose fibrous mass, and advantageously after a preliminary rolling operation as before. This loose fibrous mass is next pressed, which is best done by rollers. This pressing operation gives me a quantity of rich undiluted juice. Some juice is also secured in the beating operation and some by the preliminary rolling where this is practised as it usually is. The fibrous rolled material I next diffuse in any of the ordinary or accepted forms of apparatus. Advantageously it is placed in one of a series of 5 to 12 diffusion cells and methodically treated with a small quantity of water in the manner hereinbefore described; that is to say, the pressed excelsior-like mass coming from a previous pressing is first treated with water or juice which has circulated successively through a plurality of cells, is then washed with water or juice which has circulated through a less number and so on until it is finally treated with fresh water, or with a liquid coming from the next described rolling operation. Since the fibers produced in the described manner for the most part are loose and individually accessible to the liquid, diffusion is rapid and there is not the same necessity for many diffusion cells that exists in the usual practice. As low as 3 to 4 cells may be employed. Also, since the preliminary pressings have removed most of the rich juice, there is not much juice left to be extracted. After the material has been diffused as far as is deemed desirable, it is removed from the last cell in series and is once more submitted to a pressing operation through one or more sets of mills; preferably 3-roll mills. This removes the diffusion moisture and leaves a loose fibrous mass containing only 40 per cent. or less of water. After all the operations stated, the mass is in such a condition that rolling dries it quite perfectly. Being in the form of relatively long thin fibers it enters the mill very well even when the mill is tight set. This possibility of setting the mill tight renders it possible to secure the good degree of drying stated.

Instead of using a plurality of stationary diffusion cells in the manner indicated, the loose fibrous mass may be moved against a slowly progressing body of water by a conveyer; but this method I do not recommend as highly as the use of the ordinary type of stationary diffusion cells.

The bagasse resulting from the above operation contains 40 per cent. or less of water and is particularly suitable for use in the furnaces of the sugar factory.

In the accompanying drawings I have shown an assemblage of apparatus elements suitable for performing the process and within the present invention.

Figure 1 is a diagrammatic side elevation partly in section of the complete assemblage; and Fig. 2 is a top plan view thereof.

Referring to the drawings, 1 is a pair of crushing rolls which may be provided with disintegrating or breaking teeth if desired and may be adapted to break the cane in short lengths.

2 is a chute through which the cane is fed to the preliminary crushing rolls.

In an advantageous embodiment of the process the cane after passing through rolls 1 is fed by means of conveyer 3 to beating or shredding apparatus 4. However, if desired, the cane may be fed directly from the chute (2) through chute 5 to the beating and shredding mechanism. This alternative chute 5 allows the direct shredding and beating of the cane instead of shredding and beating of the cane after a preliminary rolling operation. The conveyer (3) travels over the pulleys 6 and directly under the opening 7 of the shredding apparatus. Shredded cane which is delivered from this apparatus in the form of loose fibrous masses is carried by the conveyer to pressing rolls 8 where a major portion of the juice is expressed. If desired, this shredded cane may be passed through a succession of rollers similar to rollers 8 but ordinarily this is not necessary in the best embodiment of the invention. From rollers 8 or any similar rollers the pressed shredded cane is fed through chute 9 to any one of the diffusion cells 11 which are operated successively in the well understood manner. For the purpose of leading the pressed and shredded cane to any particular cell the trough is pivoted at 10 and may be operated by hand or otherwise so that its extremity rests substantially over the top opening 11 of the one of the diffusion cells then in charging phase. In operation ordinarily these diffusion cells are arranged in such manner that the shredded and pressed cane is soaked with water therein in a methodical manner. I preferably use a series of 5 to 12 diffusion cells (5 being shown for sake of illustration). The excelsior-like mass coming from the pressing rolls is first treated with water or juice which has circulated successively through a plurality of cells, is then extracted or soaked with water or juice which has circulated through a less number, and so on until it is finally treated with fresh water in one of the cells, or if desired, with water coming from a succeeding rolling operation.

Any suitable type of diffusion apparatus may be used, the invention herein residing particularly in the matter of the application of diffusion to shredded or excelsior-like cane substance.

After the shredded and rolled fibrous cane has been subjected the requisite length of time to diffusion in any one cell it is removed therefrom in the usual manner. Ordinarily each cell is provided with a swinging bottom which may be lowered to clear entirely the bottom of the cell so that its whole contents is easily dumped. The diffused fibrous mass of cane when removed from any cell drops upon a horizontal conveyer 12 which transfers it to elevating conveyer 13. From this last conveyer the cane is fed to a final set of rollers 14 and is here pressed so that the water is substantially eliminated, the pressed cane finally being fed from the rollers with about 40 per cent. or less of moisture. It is advantageous to use the water from this last expression as water for diffusion purposes in the first or any one of the other diffusion cells.

What I claim is:—

1. The process of manufacturing sugar which comprises shredding or beating the cane to form a loose fibrous mass, subjecting such fibrous mass to a pressing operation, subjecting the pressed fibrous mass to a diffusion operation and finally again pressing the diffused mass.

2. In the manufacture of sugar, the process which comprises treating by a diffusion operation cane which has its fibers laterally separated, and subsequently pressing such fibrous cane to express moisture therefrom.

3. In the manufacture of sugar, the process which comprises shredding lengths of cane to produce a fibrous mass in which there is lateral separation of the fibers, rolling such fibers to express as much as possible juice therefrom, subjecting the fibrous mass after rolling to diffusion, and subsequently drying the same by pressing the moisture therefrom.

In testimony whereof, I affix my signature.

. WILLIAM SEARBY.